United States Patent
Theobald et al.

[11] Patent Number: 5,567,036
[45] Date of Patent: Oct. 22, 1996

[54] CLEARANCE AND SIDE MARKER LAMP

[75] Inventors: Greg Theobald, Aurora, Ind.; Luigi Tavernese, Brantford, Canada; Fred Boles; Edwin Sugg, both of Madison, Ind.

[73] Assignee: Grote Industries, Inc., Madison, Ind.

[21] Appl. No.: 417,656

[22] Filed: Apr. 5, 1995

[51] Int. Cl.$^6$ ............................................ B60Q 1/00
[52] U.S. Cl. ............................ 362/80; 362/236; 362/800
[58] Field of Search ........................... 362/61, 80, 236, 362/800

[56] References Cited

U.S. PATENT DOCUMENTS

| | | | |
|---|---|---|---|
| 3,474,381 | 10/1921 | Baldwin | 362/226 |
| 4,124,881 | 11/1978 | Haber et al. | 362/253 |
| 4,654,629 | 3/1987 | Bezos et al. | 340/87 |
| 4,680,678 | 7/1987 | Iwaki | 362/61 |
| 4,893,223 | 1/1990 | Arnold | 362/252 |
| 4,929,866 | 5/1990 | Murata et al. | 313/500 |
| 4,977,487 | 12/1990 | Okano | 362/32 |
| 5,006,971 | 4/1991 | Jenkins | 362/252 |
| 5,084,804 | 1/1992 | Schairer | 362/61 |
| 5,101,326 | 3/1992 | Roney | 362/61 |
| 5,162,696 | 11/1992 | Goodrich | 313/511 |
| 5,319,531 | 6/1994 | Kutnyak | 362/184 |
| 5,436,809 | 7/1995 | Brassier et al. | 362/800 |

*Primary Examiner*—James C. Yeung
*Assistant Examiner*—Alfred Basichas
*Attorney, Agent, or Firm*—Woodard, Emhardt, Naughton, Moriarty & McNett

[57] ABSTRACT

A clearance and side marker lamp, or PC lamp, such as for truck/trailer combinations, is provided with LEDs mounted to a plurality of circuit boards. The circuit boards are mounted at predetermined angles relative to each other for directing light in at least three directions. A lens is provided in front of the LEDs and includes a series of prism optics for spreading the light emitted from the LEDs into an arc of up to 180 degrees.

19 Claims, 7 Drawing Sheets

CLEARANCE AND SIDE MARKER LAMP

BACKGROUND OF THE INVENTION

This invention relates generally to lamps for use with motor vehicles, and more particularly to vehicle lamps having an array of light emitting diodes (LEDs) to provide both clearance and side marker functions.

The Society of Automotive Engineers (SAE), in SAE standard J592 JUN92, defines a clearance lamp as a lamp mounted on a vehicle to provide light to the front or rear to indicate the overall width and height of the vehicle. A side marker lamp is defined as a lamp mounted on a vehicle to provide light to the side to indicate the overall length of the vehicle. Finally, a combination clearance and side marker lamp, designated by the code "PC", is defined as a lamp simultaneously fulfilling the requirements of both clearance and side marker lamps. Typically, clearance, side marker lamps and PC lamps used on automobiles and truck/trailer combinations use standard high-intensity incandescent bulbs as a light source with an optical lens in front of the light source to provide a desired photometric pattern. The lens usually provides an important second function of protecting the light source from dirt, moisture and other foreign matter. Incandescent light sources, however, have a relatively short life and may further be somewhat delicate in that excessive handling may result in failure due to filament breakage.

LEDs are useful in vehicle lamps such as for combination brake, turn and tail lamps, and for clearance or side marker lamps. An advantage of using LEDs is that they have an operating life of up to 100,000 hours before they begin to degrade.

Ordinarily, LEDs are not used in PC lamps due to the difficulty in designing lens optics to spread the light, emitted by an LED in a narrow cone pattern, into an arc pattern of up to 180 degrees. Moreover, providing a PC lamp with LEDs would require multiple LEDs in order to satisfy the Federal Motor Vehicle Safety Standard (FMVSS) 108 lighting requirements. Using multiple LEDs in a single lamp housing thus further creates heat dissipation concerns since it is known that high LED junction temperatures can significantly reduce LED light output. What is therefore needed is a PC lamp assembly that uses a robust light source having a long lifetime, and that sufficiently dissipates heat so as not to degrade the light source.

SUMMARY OF THE INVENTION

In accordance with one aspect of the present invention, a clearance/side marker lamp for a motor vehicle comprises a housing, a first plurality of light emitting diodes arranged within the housing and collectively operable to emit light in a first direction, a second plurality of light emitting diodes arranged within the housing and collectively operable to emit light in a second direction and a third plurality of light emitting diodes arranged within the housing and collectively operable to emit light in a third direction. The second and third directions are each arranged at an acute angle relative to the first direction, and the third direction is arranged at an obtuse angle relative to the second direction. The first, second and third directions are further arranged in a common plane such that the light emitting diodes emit light in an arc pattern within the common plane.

In accordance with another aspect of the present invention, a clearance/side marker lamp for a motor vehicle comprises a first circuit board having a first mounting surface for mounting at least one light emitting diode thereto, and a plurality of secondary circuit boards each having a second mounting surface for mounting at least one light emitting diode thereto. Each of the secondary circuit boards is rigidly attached to the first circuit board such that the second mounting surfaces are directed at a predetermined acute angle away from the first mounting surface. A housing is further included for receiving the circuit board assembly therein and has a first surface for mounting the first circuit board thereto. The light emitting diodes are mounted to each of the circuit boards such that light emitted therefrom has a beam axis directed perpendicularly away from the corresponding mounting surfaces.

In accordance with a further aspect of the present invention, a clearance/side marker lamp for a motor vehicle comprises a housing having a front portion, a rear portion and a body disposed therebetween, a plurality of light emitting diodes arranged within the housing wherein the plurality of light emitting diodes are operable to emit light toward the front and rear portions, and away from the body, and a lens mounted to the housing in front of the light emitting diodes. The lens has means for spreading the light emitted by the light emitting diodes through a range of approximately 180 degrees from the front portion to the rear portion.

One object of the present invention is to provide a combination clearance and side marker lamp having light emitting diodes as light sources in a single housing.

Another object of the present invention is to provide a combination clearance and side marker lamp having light emitting diodes mounted to a plurality of circuit boards disposed at multiple angles within a housing.

A further aspect of the present invention is to provide a combination clearance and side marker lamp having light emitting diodes as light sources wherein a lens is provided to spread light emitted from the diodes in an arc spanning approximately 180 degrees.

These and other objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
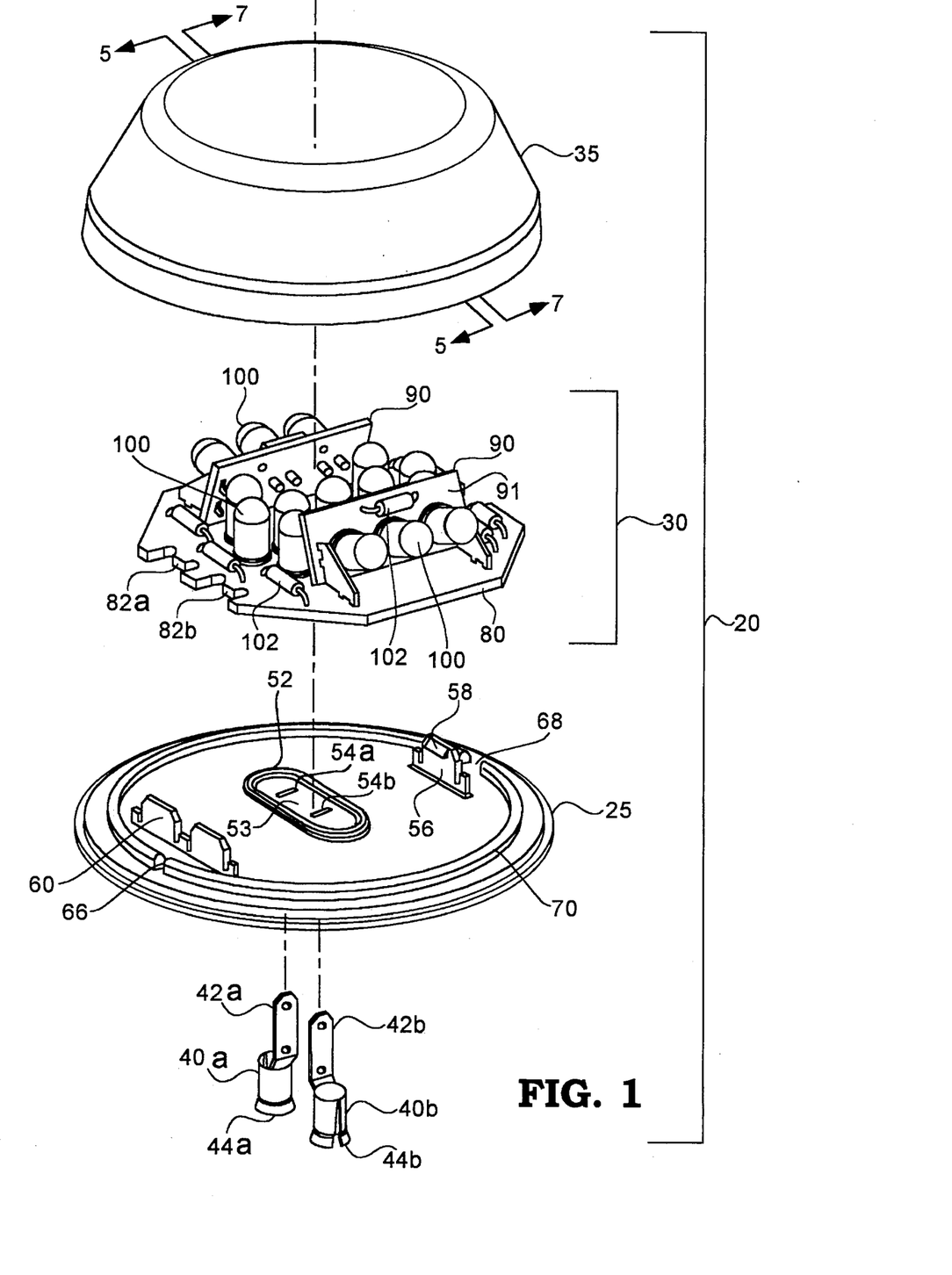
FIG. 1 is an assembly drawing of a clearance and side marker lamp in accordance with the present invention.

Referring now to FIG. 1, a clearance and side marker lamp assembly 20, in accordance with the present invention, is shown. Lamp assembly 20 includes a housing 25 which, in a preferred embodiment, is generally circular in shape. Lamp assembly 20 further includes a circuit board assembly 30 including a plurality of light sources 100 which are mounted to a main circuit board 80 and a number of secondary circuit boards 90 attached thereto. The circuit board assembly 30 is attached to the housing 25 in a manner more fully described hereinafter. A lens member 35 is further provided and is attachable to the housing 25 such that the circuit board assembly 30 is situated between the housing 25 and lens member 35. Circuit board assembly 30 and lens member 35 are also preferably generally circular in shape, although the present invention contemplates providing housing 25, circuit board assembly 30 and lens member 35 in a variety of shapes including, for example, square, rectangular, oval, hexagonal octagonal, D-shaped, as well as other desired geometric shapes.

Figure 2:
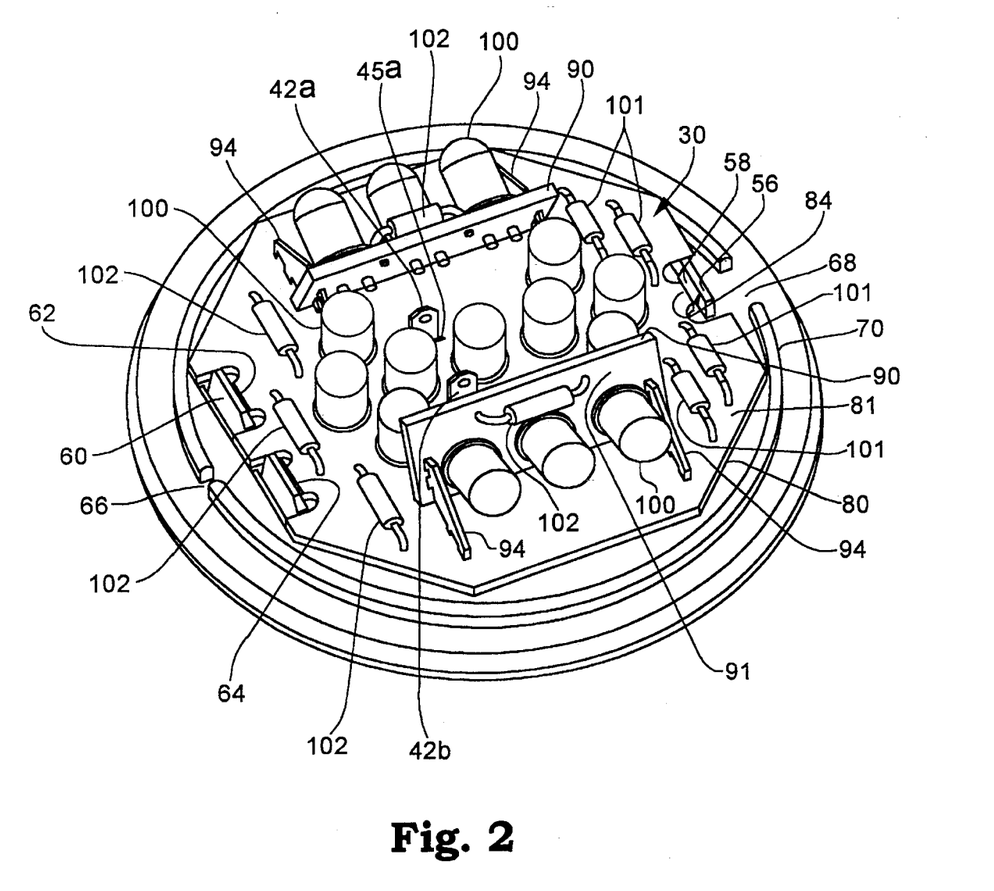
FIG. 2 is a perspective view of the circuit board and housing portions of the embodiment shown in FIG. 1.

Housing 25 has a pair of slots 54a and 54b disposed therethrough which receive terminals 42a and 42b of electrical connectors 40a and 40b, respectively. Electrical connectors 40a and 40b further define hollow cylindrical portions 44a and 44b, opposite terminals 42a and 42b respectively, for receiving a mating connector of, for example, an automotive wiring harness (not shown). Although portions 44a and 44b are shown to be circular in cross-section, the present invention contemplates providing portions 44a and 44b in various other shapes such as, for example, square, rectangular, oval, D-shaped, and other desired configurations. As a practical matter, electrical connectors 40a and 40b may be provided with variously configured connecting portions for connection to any correspondingly shaped mating connector. Referring now to FIGS. 1 and 2, housing 25 includes locking tabs 56 and 60 for securing circuit board 80 thereto. Locking tab 56 includes a beveled flange portion 58 for trapping a tongue portion 84 of circuit board 80 thereunder. Similarly, locking tab 60 includes beveled flange portions 62 and 64 for trapping corresponding tongues 82a and 82b of circuit board 80 thereunder. In assembling lamp assembly 20, tongues 82a, 82b, and 84 of circuit board 80 are trapped between flange portions 62, 64, and 58, respectively, for securing circuit board assembly 30 to housing 25.

Housing 25 is further provided with a wall portion 52 around slots 54a and 54b which defines a well 53 therein. After terminals 42a and 42b are received within slots 54a and 54b respectively, well 53 is filled with a material suitable for sealing terminals 42a and 42b to housing 25 to whereby keep out moisture and other foreign matter. Preferably, well 53 is filled with a low viscosity adhesive which is thereafter cured to a hardened state in the presence of ultraviolet light. The present invention further contemplates utilizing other known sealing materials in well 53 including, for example, epoxy resin, malleable plastic, polyimide, and conformal coating. Circuit board 80 further includes a pair of slots 45a and 45b (slot 45a only shown in FIG. 2) which are juxtaposed over slots 54a and 54b of housing 25 when circuit board 80 is secured thereto. Terminals 42a and 42b are received through slots 45a/54a and 45b/54b, respectively, for supplying power from an external power source (not shown) to circuit board assembly 30. Housing 25 further includes an alignment ring 70 which partially circumscribes circuit board assembly 30, and provides means for positioning the lens 35 on the housing 25 prior to attaching the lens 35 thereto. As most clearly shown in FIGS. 5–7, lens member 35 includes alignment ribs 150, 160a and 160b which are received within slots 66 and 68, respectively, of alignment ring 70. As most clearly shown in FIG. 6, lens 35 further includes a concentric lip 159 which contacts alignment ring 70 when lens 35 is positioned on housing 25, such that alignment rib 150 is received within slot 66 and alignment ribs 160a and 160b are received within slot 68 to thereby properly position lens 35 to meet FMVSS 108 photometric pattern requirements. Lens 35 is thereafter attached to housing 25 by suitable means such as vibration welding, for example, to provide a hermetic seal therebetween to keep foreign matter such as water, dirt, and other debris from contaminating the interior space defined between housing 25 and lens member 35. Lens 35 further defines a flash channel 158 adjacent concentric lip 159 which serves to trap excess material from the vibration weld process therein. It is to be understood, however, that the present invention contemplates other known means for attaching lens 35 to housing 25 such as, for example, adhesive, elastomer seals, and the like.

Figures 3, 4:
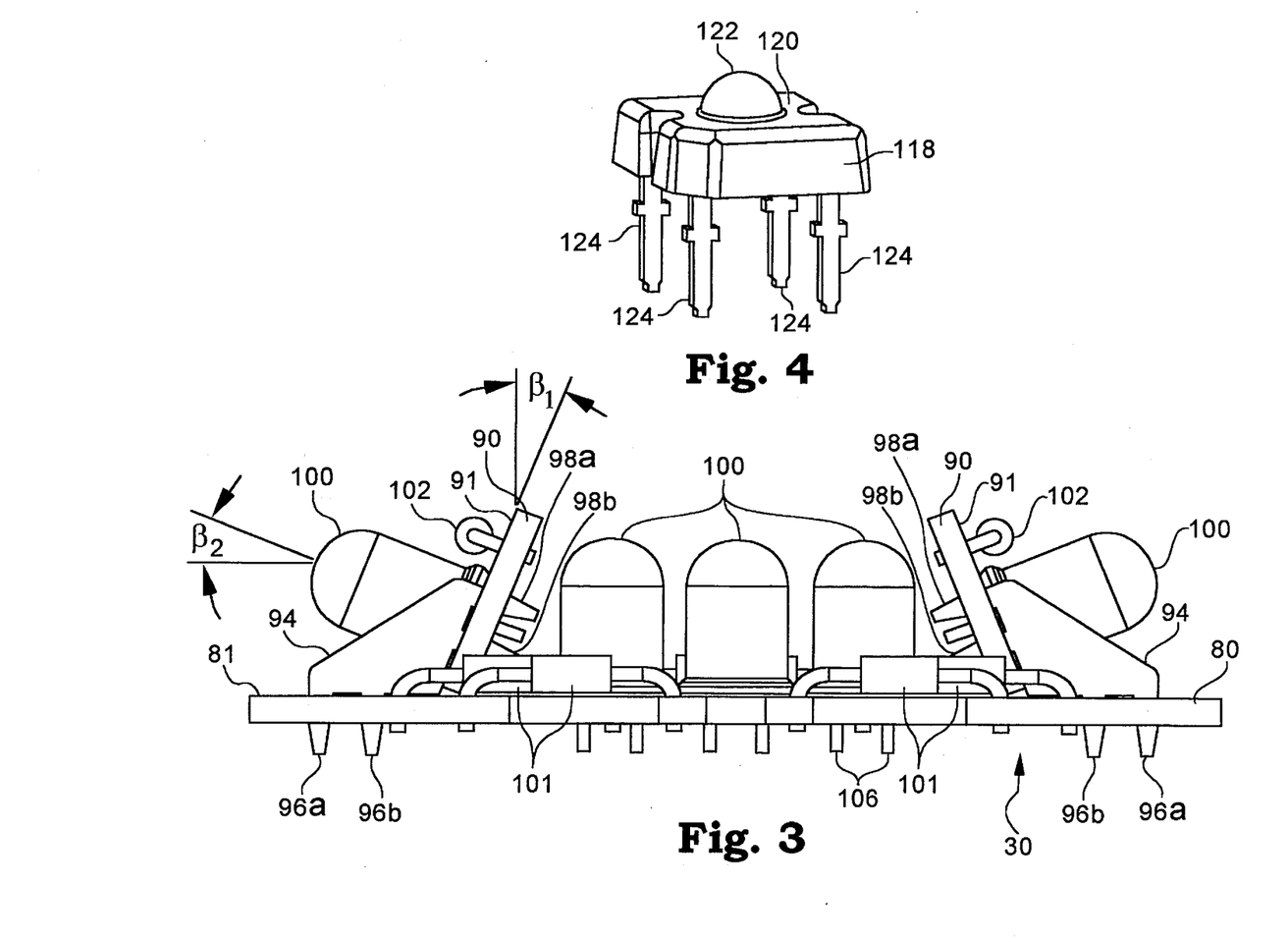
FIG. 3 is a side elevational view of the circuit board and light source portion of the embodiment shown in FIG. 1.
FIG. 4 is an elevational view of an alternate light source for use with the embodiment shown in FIG. 1.

Referring now to FIGS. 2 and 3, circuit board assembly 30 will be described in detail. Circuit board assembly 30 includes a first circuit board 80 which is secured to housing 25 via tongues 82a, 82b, and 84 as previously discussed. Circuit board 80 further includes a plurality of light sources 100 for emitting light generally perpendicularly away from the top surface 81 of circuit board 80. Light sources 100 are preferably light emitting diodes (LEDs) which are connected to a power source (not shown), through a network of current limiting resistors 102, via electrical connectors 42a and 42b. Preferably, the LEDs 100 are grouped such that one resistor 102 provides current to three LEDs 100. In operation, resistors 102 are sized so that each group of LEDs, when energized, achieves a desired luminescence, but does not overheat during extended operation. A series of four general purpose diodes 101 are also provided in a bridge configuration, as is commonly known in the art, for ensuring current flow in the proper direction regardless of the polarity connection of the power source (not shown) to terminals 42a and 42b.

In one embodiment, LEDs 100 are T 1¾ LEDs which have a generally cylindrically-shaped body and define a dome at their light emitting ends. Although the dome-shaped ends facilitate the directional spreading of light, LEDs are generally considered to be directional light sources such that light is emitted therefrom in a direction generally parallel with the longitudinal axis of the cylindrical body. Opposite their light emitting ends, the T 1¾ LEDs are generally flat for facilitating mounting of the LEDs 100 to a flat circuit board, and have a pair of terminals 106 extending therefrom for receiving power.

Referring now to FIG. 4, an alternate LED design 118 may be used in place of LEDs 100. LEDs 118 are preferably High Power Automotive LEDs available through Hewlett-Packard Company as HPWA-MH00 (red-orange), HPWA-ML00 (amber) and HPWR-M300 (deep red). The side marker/clearance lamp of the present invention requires LEDs 118 to be amber so that HPWA-ML00 LEDs 118 are preferably used. LEDs 118 have a generally rectangular body portion 120 with a dome-shaped light emitting portion 122 extending therefrom. Leads 124 extend from the underside of the body portion 120 for receiving power. LEDs 118 may have two leads 124 as is conventional, or may alternatively have four leads 124 as shown in FIG. 4. The two additional leads provide a two-fold benefit. The first is redundant electrical and structural connections for functional and structural reliability, and the second is to provide an efficient heat sink for drawing heat, generated by LEDs 188, away from the light emitting portions.

Referring again to FIGS. 2 and 3, circuit board assembly 30 further includes a pair of secondary circuit boards 90, attached to circuit board 80 via connectors 94. Each of the connectors 94 include a pair of extensions 96a and 96b at one end for attachment to circuit board 80, and extensions 98a and 98b at an opposite end for connection to a circuit board 90. Preferably, circuit boards 80 and 90, are made of commonly known printed rigid circuit board material such as ceramic, fiberglass, or similar composite material, having conductive circuit pattern material adhered to the top, bottom, and/or inner portion thereof. Connector 94 is preferably a stamped brass terminal which has been tin plated to facilitate electrical connection by conventional methods such as soldering.

Extension 96a is electrically connected to extension 98a, and extension 96b is electrically connected to extension 98b. Thus, by making electrical connections between extensions 96a/96b and circuit board 80, and between extensions 98a/98b and circuit board 90, each of the circuit boards 90 may be electrically connected to circuit board 80. Although extension 96a, 96b, 98a, and 98b may be connected to a corresponding circuit board by various known methods, circuit boards 80 and 90 preferably contain holes disposed therethrough for receiving extensions 96a–98b. Extensions 96a–98b of the connectors 94 may then be simultaneously electrically and structurally connected to circuit boards 80 and 90 via known processes such as, for example, manual soldering, wave soldering, or the like.

Each of the circuit boards 90 has a surface 91 for connecting a plurality of LEDs 100 thereto such that light emitted therefrom is directed generally perpendicularly away from circuit board surface 91. Similarly, circuit board 80 has a surface 81 for connecting a plurality of LEDs 100 thereto such that light emitted therefrom is directed generally perpendicularly away from circuit board surface 81. Connectors 94 are configured such that circuit board surface 91 is disposed at a predetermined angle $\beta 1$ with respect to an axis perpendicular to circuit board surface 81 of circuit board 80, when circuit board 90 is attached thereto. Securing circuit boards 90 to circuit board 80 via connectors 94 thus provides an important aspect of the present invention in that the LEDs 100 (or 118) may easily be flush-mounted to the respective surfaces 91 and 81 via known techniques to achieve directional lighting without having to aim the LEDs themselves. In a preferred embodiment, $\beta 1$ is set at approximately 20 degrees so that light from the LEDs mounted to each of the secondary circuit boards 90 is emitted in a direction approximately 70 degrees from the direction of light emitted from the LEDs mounted to surface 81 of main circuit board 80. However, the present invention contemplates setting $\beta 1$ between 0 and 30 degrees so that light emitted from the LEDs mounted to each of the secondary circuit boards 90 is emitted in a direction between approximately 60 and 90 degrees from an axis perpendicular to circuit board surface 81. As shown in FIGS. 1–3, two secondary circuit boards 90 are shown structurally and electrically connected to circuit board 80, in a manner described above, on either side of a plurality of LEDs 100 mounted to the surface 81 of main circuit board 80. With this arrangement, light is emitted from circuit board assembly 30 along three directions in a common plane; generally perpendicular to circuit board face 81, generally perpendicular to circuit board face 91, and at an angle $\beta 2$ above a plane parallel with circuit board surface 81, and generally perpendicular to circuit board face 91 of oppositely facing circuit board 90 and at an angle of $\beta 2$ along a plane perpendicular to circuit board surface 81. Each of the circuit boards 90 thus include LEDs emitting light in opposite directions of approximately 70 degrees from the direction of light emitted by LEDs mounted to surface 81 of circuit board 80, and correspondingly in directions approximately 140 degrees from each other. Through proper mounting and positioning of housing 25, side, forward clearance and rear clearance lighting may thus be provided by lamp assembly 20. It is to be understood, however, that the present invention should not be considered to be limited to the use of two secondary circuit boards. Alternatively, the present invention may include any number of secondary circuit boards 90 to further provide light emitted in a variety of additional directions and at any desired angle. Moreover, secondary circuit boards 90 may be flexible to permit adjustable positioning of the LEDs.

Figure 5:
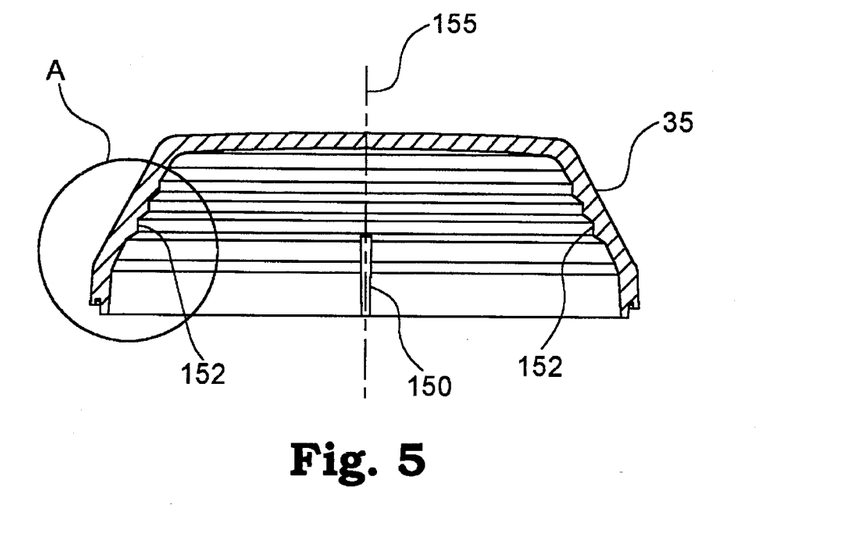
FIG. 5 is a cross-sectional view of the lens portion, shown in FIG. 1, along the sections lines 5—5.
Figure 6:
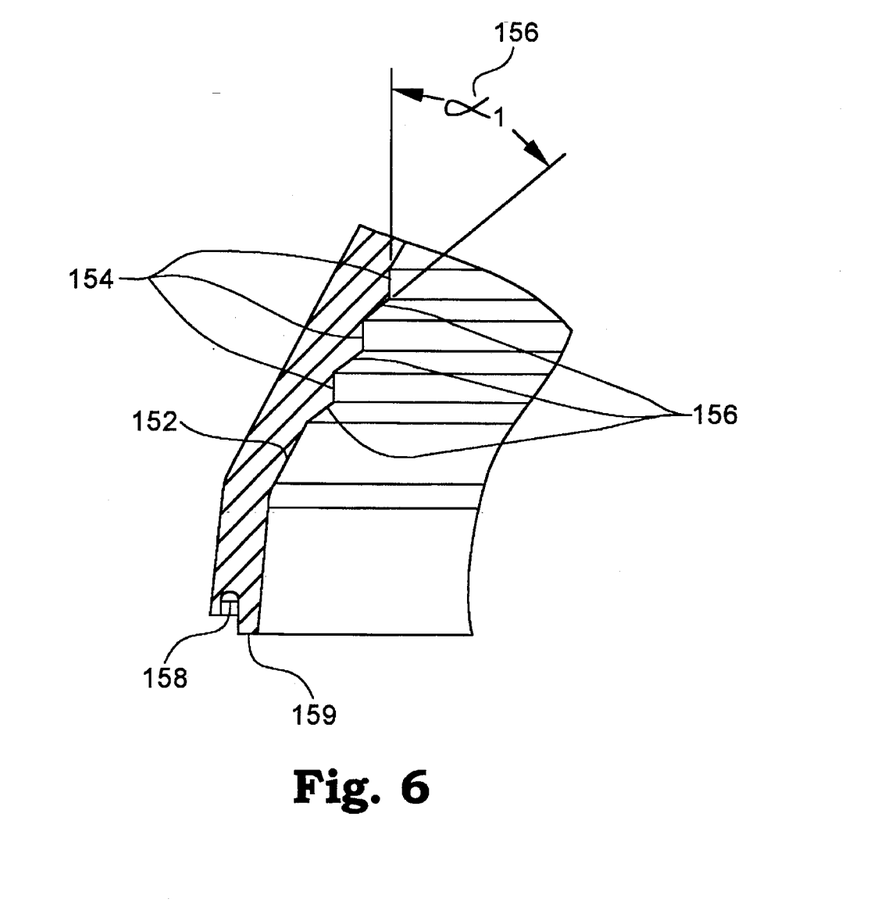
FIG. 6 is a magnified view of the area A shown in FIG. 5.
Figure 7:
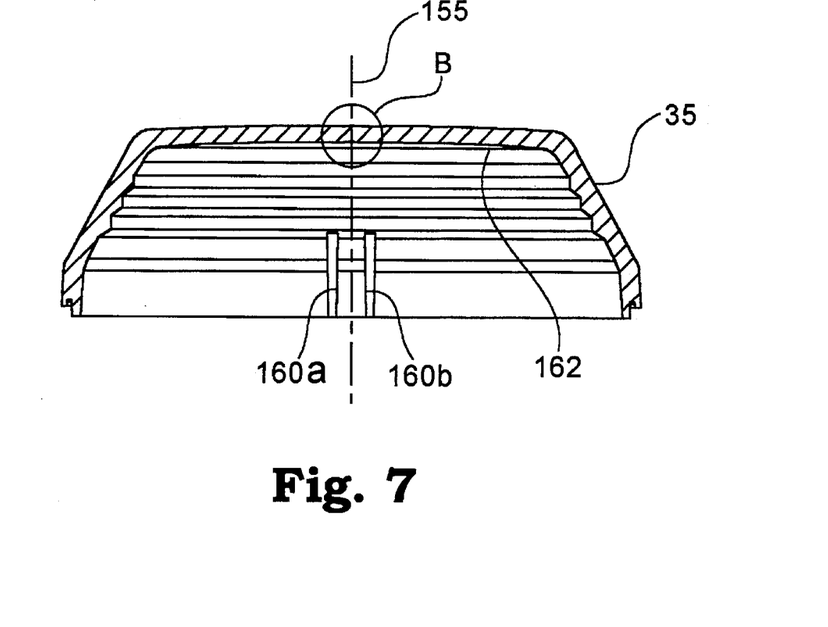
FIG. 7 is a cross-sectional view of the lens portion, shown in FIG. 1, along the sections lines 7—7.
Figure 8:
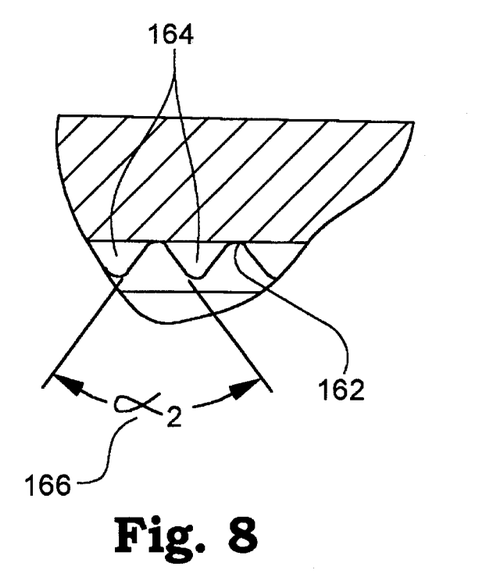
FIG. 8 is a magnified view of region B shown in FIG. 7.

It should also be pointed out that providing multiple circuit boards, connected in the manner described herein, facilitates the dissipation of heat generated by the LEDs 100 by providing air flow between the main circuit board 80 and the secondary circuit boards 90. Such a multiple circuit board configuration provides increased heat dissipation over single circuit boards having a curved or sloped configuration resulting in longer LED life. Referring now to FIG. 5, lens member 35 is shown in cross-section along section lines 5—5 of FIG. 1. Area A is shown in greater detail in FIG. 6, wherein the interior sides 152 of lens 35 are stepped to include a series of vertical portions 154 which are generally parallel with vertical axes 155. Angled portions 156 connect vertical steps 154 such that a series of light-spreading steps are defined along the interior side surface 152 of lens 35. Angled portions 156 connect each vertical step 154 at a predetermined angle $\alpha 1$. In a preferred embodiment, $\alpha 1$ is set at 50 degrees, although the present invention contemplates $\alpha 1$ values of between 10 and 90. The series of light spreading steps defined by vertical steps 154 and angled portions 156 are thus designed to spread light directed at interior lens surface 152 to a radius of approximately 50 degrees. Referring now to FIG. 7, a cross-section of lens member 35 is shown along section lines 7—7 of FIG. 1. Area B of FIG. 7 is shown in greater detail in FIG. 8 wherein the inner top surface 162 of lens 35 defines angled portions 164 therein. Each angled portion 164 defines a surface 166 which is disposed at an angle $\alpha 2$ from a surface 168 of an adjacent angled portion 164. Preferably, angled portions 164 are uniformly arranged such that each surface 166 and 168 is disposed at an angle $\alpha 2/2$ with respect to perpendicular axis 155. In a preferred embodiment, $\alpha 2$ is set at 35 degrees, although the present invention contemplates $\alpha 2$ angles of between 10 and 90. Angled portions 164 are thus designed to spread light directed at interior lens surface 162 to a radius of approximately 100 degrees.

Lens member 35 is configured to work in cooperative arrangement with circuit board assembly 30 to spread the light emitted from LEDs 100 to an arc of constant light spanning approximately 180 degrees. Light is emitted via LEDs mounted to oppositely facing circuit boards 90, and to circuit board 80, and is subsequently received at oppositely facing surfaces 152, and at surface 162, respectively, of lens member 35. Angled portions 164 and light spreading steps defined by vertical steps 154 and angled portions 156 spread the light received at these surfaces to an arc of continuous light spanning approximately 180 degrees.

Figure 9:
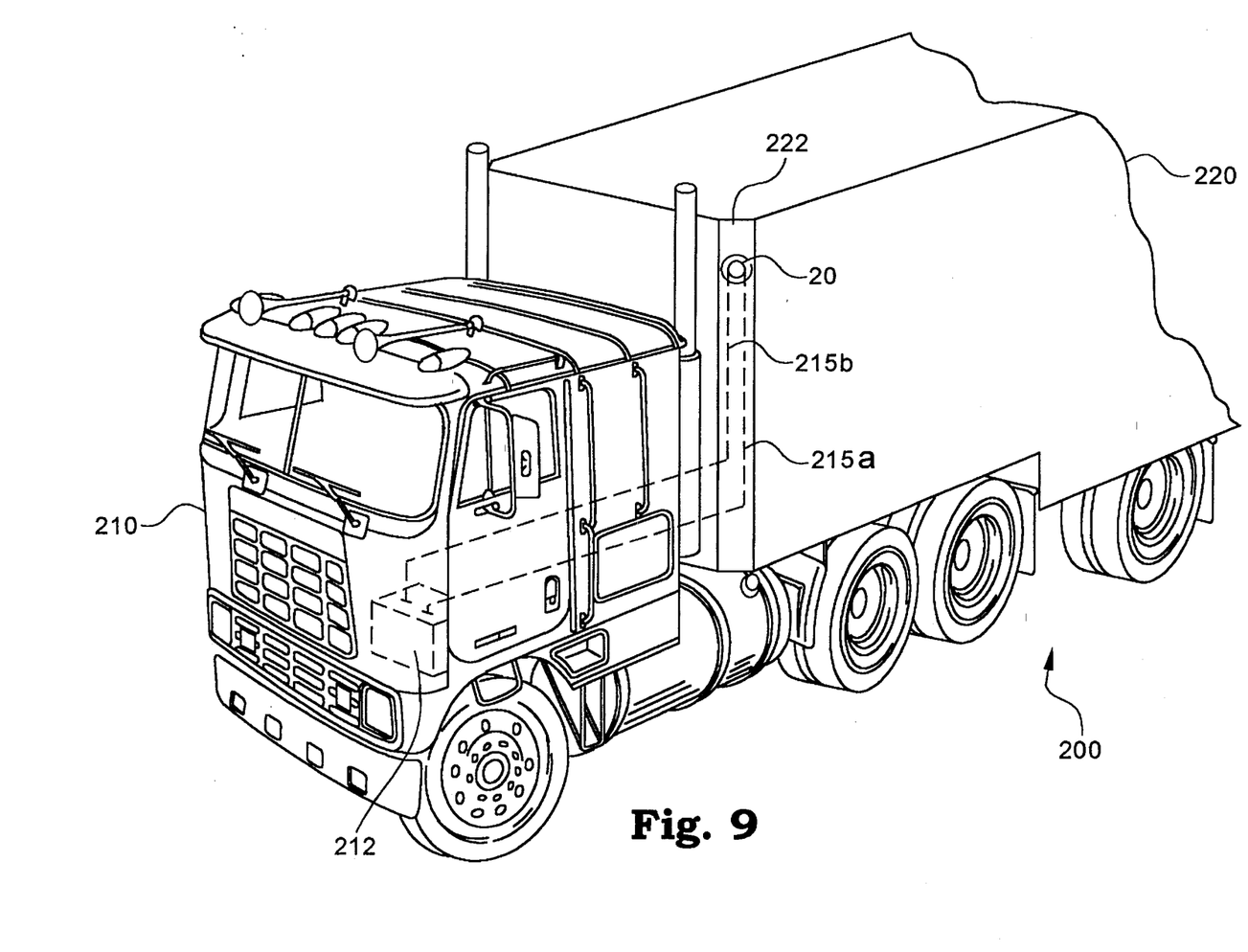
FIG. 9 is a diagrammatic illustration of a truck-trailer combination showing a typical application of the clearance and side marker lamp embodiment of FIG. 1 in use therewith.

Referring now to FIG. 9, an application of the clearance and side marker lamp of the present invention is shown. A truck-trailer combination 200 includes a truck portion 210 connected to a-trailer portion 220 shown in partial cutaway. Such truck-trailer combinations are commonly used to transport a variety of goods between intercontinental locations. Trailers 220 are commonly rectangularly shaped, and have either rounded or angled corners 222. Lamp assembly 20 is attached to angled portion 222 of trailer 220, and electrically connected to a power source 212 of truck 210 via electrical lines 215a and 215b. Typically, lamp assembly 20 is not directly connected to truck power source 212, but is rather connected to the electrical system of truck 210 which is powered by power source 212 during operation of truck 210. Typically, power source 212 is a 12-volt battery commonly known in the automotive industry.

Although lamp assembly 20 is shown in FIG. 9 as being connected to angled portion 222 near the top 224 of trailer 220, it is to be understood that lamp assembly 20 may be attached to angled portion 222 at any desired location. With amp assembly 20 so connected, front clearance, rear clearance and side marking requirements are simultaneously satisfied. Any number of LEDs 100 (or 118) may be used with lamp assembly 20 although, as a practical matter, the main circuit board 80 and secondary circuit boards 90 must include enough LEDs to satisfy the required luminescence requirements. For the application shown in FIG. 9, for example, FMVSS 108 lighting requirements dictate that a combination side marker and clearance (PC) lamp must provide side marker light intensity of at least 0.62 candela over a range of 90 degrees, and clearance light intensity of at least 0.62 candela over a range of 90 degrees.

Through experimentation, it has been found that lamp assembly 20 having at least 9 T 1¾ LEDs mounted to the main circuit board 80, and at least three T 1¾ LEDs mounted to each secondary circuit board 90 meets these minimum requirements. Lamp assembly 20 has been designed, with the specified light beam angles, to minimize the total number of LEDs required for optimal efficiency and statistical capability.

Figure 10:
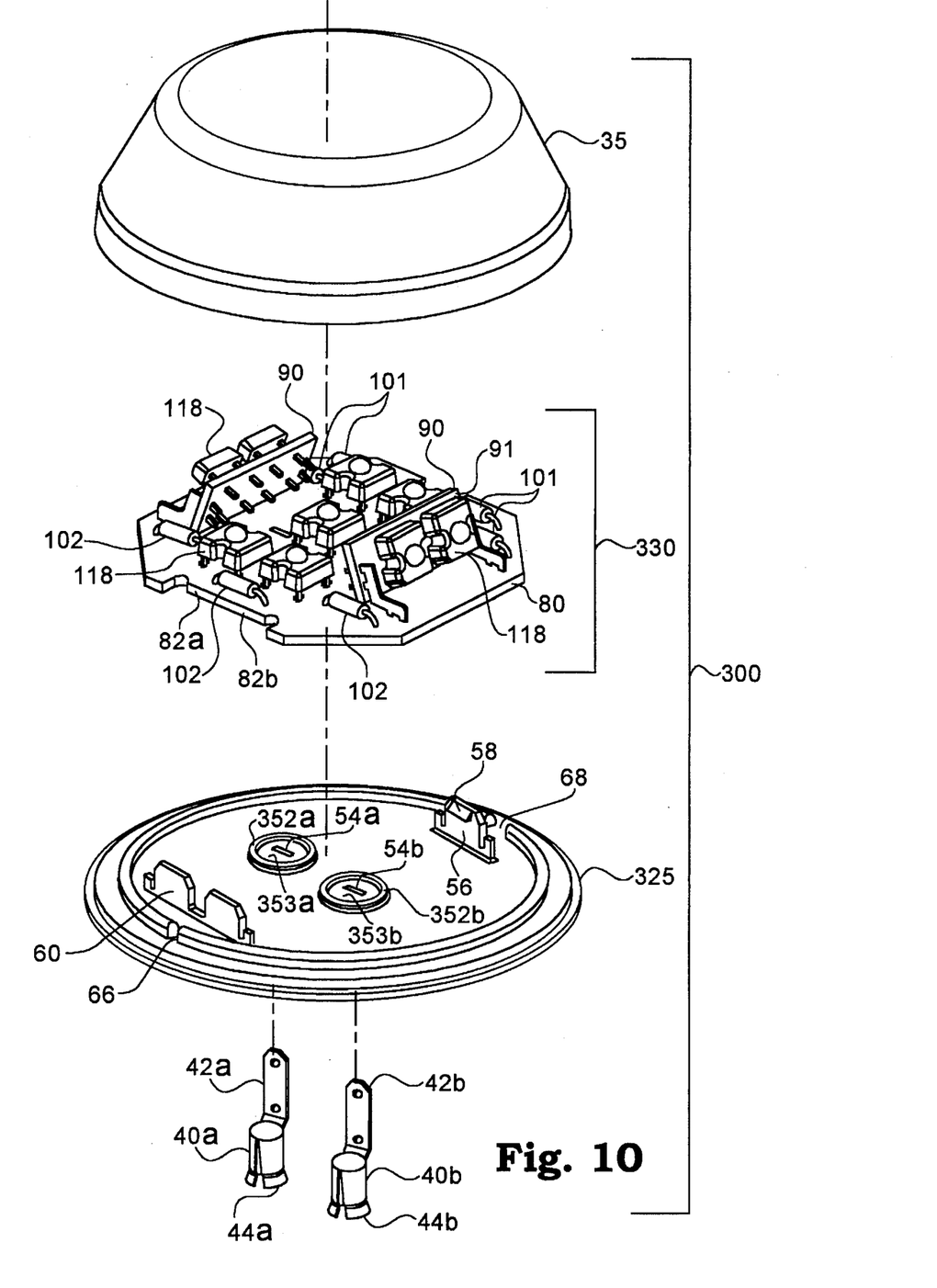
FIG. 10 is an assembly drawing of a clearance and side marker lamp in accordance with an alternate embodiment of the present invention.

The use of Power Automotive LEDs 118, on the other hand, permits approximately a 50% reduction in the number of LEDs required to meet the foregoing luminescence requirements. As shown in FIG. 10, side marker lamp assembly 300, in accordance with an alternative embodiment of the present invention, requires only 9 LEDs 188 as compared to the 15 LEDs 100 of the side marker lamp assembly embodiment 20 shown in FIGS. 1–3. Referring now to FIG. 10, side marker lamp assembly embodiment 300 is identical in most respects to the side marker lamp embodiment 20 of FIGS. 1–3 and like elements are therefore identified by like numbers. However, a few notable modifications are included in embodiment 300.

First, the 15 LEDs 100 have been replaced by 9 LEDs 118 to form a new circuit board assembly 330. It has been found through experimentation that the above-mentioned luminescence requirements can be met with 5 LEDs 118 attached to circuit board 80, and 2 LEDs 118 attached to each of the angled circuit boards 90. With the exception of additional holes provided therethrough for receiving the four-terminal LEDs 118, circuit boards 80 and 90 remain unchanged.

As a second modification to the lamp assembly 300 over the lamp assembly 20 of FIG. 1, housing 325 has been configured slightly differently than housing 25. Specifically, wall 52 surrounding terminals 42a and 42b (FIG. 1) has been separated into two walls; wall 352a which surrounds terminal 42a and defines a well 353a therein, and wall 352b which surrounds terminal 42b and defines a well 353b therein. An important advantage of the two-welled configuration 353a and 353b is that it requires less adhesive material khan the single well 53 of FIG. 1 for sealing the terminals 42a and 42b to the housing 325.

Finally, due to the reduction in the number of LEDs 118, the number of supporting circuit components has been correspondingly reduced. Specifically, the number of current limiting resistors 102 has been reduced from five, in lamp assembly 20, to three in lamp assembly 300. The criteria for grouping the resistors 102 and for choosing the resistor values is the same as previously described with respect to lamp assembly 20.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, other applications of the present invention may have luminescence requirements different from the PC-90 requirements of the present invention, and those skilled in the art will recognize that LEDs may be added to, or deleted from, lamp assembly 20 (or lamp assembly 300) to meet such requirements.

What is claimed is:

1. A clearance/side marker lamp for a motor vehicle comprising:

a rigid housing;

a first plurality of light emitting diodes arranged within said housing and collectively operable to emit light generally in a first direction;

a second plurality of light emitting diodes arranged within said housing and collectively operable to emit light generally in a second direction, said second direction being arranged at an acute angle relative to said first direction;

a third plurality of light emitting diodes arranged within said housing and collectively operable to emit light generally in a third direction, said third direction being arranged at an acute angle relative to said first direction and at an obtuse angle relative to said second direction; and a lens positioned in front of said plurality of light emitting diodes, said lens configured to receive light emitted in said first, second and third directions and spread said light in an arc of continuous light spanning approximately 180 degrees.

2. The clearance/side marker lamp of claim 1 wherein said housing has a top surface for mounting said light emitting diodes thereto;

and wherein said first direction is defined to be perpendicularly away from said top surface.

3. The clearance/side marker lamp of claim 2 wherein said housing further includes a front portion;

and wherein said second plurality of light emitting diodes is positioned within said housing to emit light toward said front portion.

4. The clearance/side marker lamp of claim 3 wherein said housing further includes a rear portion opposite said front portion;

and wherein said third plurality of light emitting diodes is positioned within said housing to emit light toward said rear portion.

5. The clearance/side marker lamp of claim 1 wherein said motor vehicle includes a power source and said lamp is connected to said power source such that said lamp is energized when said motor vehicle in operation.

6. The clearance/side marker lamp of claim 5 wherein said motor vehicle is a truck having a trailer in tow.

7. The clearance/side marker lamp of claim 6 wherein said trailer includes a front portion having two corners and a rear portion, said trailer defining a longitudinal axis between said front and rear portions;

and wherein said lamp is mounted on at least one of said front corners at an angle of approximately 45 degrees relative to said longitudinal axis.

8. A clearance/side marker lamp for a motor vehicle comprising:

a first circuit board having a first mounting surface for mounting at least one light emitting diode thereto;

a plurality of secondary circuit boards each having a second mounting surface for mounting at least one light emitting diode thereto, each of said secondary circuit boards being rigidly attached to said first circuit board such that said second mounting surfaces are directed at a predetermined acute angle away from said first mounting surface;

wherein said light emitting diodes are mounted to each of said circuit boards such that light emitted therefrom has a beam axis directed perpendicularly away from said mounting surfaces corresponding thereto; and a housing for receiving said circuit board assembly therein, said housing having a first surface for mounting said first circuit board thereto.

9. The clearance/side marker lamp of claim 8 further including means for electrically connecting and rigidly attaching said plurality of secondary circuit boards to said first circuit board.

10. The clearance/side marker lamp of claim 8 further including:

electrical terminals for connecting said light emitting diodes to a source of power;

wherein said housing includes a bottom surface opposite said top surface and said electrical terminals extend through said housing from said bottom surface for connection to said first circuit board.

11. The clearance/side marker lamp of claim 8 wherein said predetermined acute angle is greater than 60 degrees.

12. The clearance/side marker lamp of claim 11 wherein said first circuit board includes a plurality of light emitting diodes mounted thereto with at least two of said secondary circuit boards mounted on opposite sides thereof such that said second mounting surfaces are each directed away from said plurality of light emitting diodes.

13. The clearance/side marker lamp of claim 12 wherein each of said plurality of light emitting diodes is a T 1-¾ light emitting diode.

14. The clearance/side marker lamp of claim 12 wherein each of said plurality of light emitting diodes is a High Power Automotive light emitting diode.

15. A clearance/side marker lamp for a motor vehicle comprising:

a housing having a front portion, a rear portion and a body disposed therebetween;

a plurality of light emitting diodes arranged within said housing, said plurality of light emitting diodes being operable to emit light toward said front portion, toward said rear portion and away from said body; and a lens mounted to said housing in front of said light emitting diodes, said lens having means for spreading said light emitted by said light emitting diodes through a range of approximately 180 degrees from said front portion to said rear portion.

16. The clearance/side marker lamp of claim 15 wherein said lens includes a top portion, said top portion being configured to spread light emitted in a first direction perpendicularly away from said body to within a first predetermined angle of said first direction.

17. The clearance/side marker lamp of claim 16 wherein said lens further includes a front portion, said front portion of said lens being configured to spread light emitted in a second direction toward said front portion of said housing to within a second predetermined angle of said second direction.

18. The clearance/side marker lamp of claim 17 wherein said lens further includes a rear portion, said rear portion of said lens being configured to spread light emitted in a third direction toward said rear portion of said housing to within a third predetermined angle of said third direction.

19. The clearance/side marker lamp of claim 18 wherein said first predetermined angle is approximately 100 degrees and said second and third predetermined angles are approximately 50 degrees.

* * * * *